No. 719,550. PATENTED FEB. 3, 1903
H. T. ZEMPEL.
DRAFT EQUALIZER.
APPLICATION FILED MAR. 11, 1902.
NO MODEL.
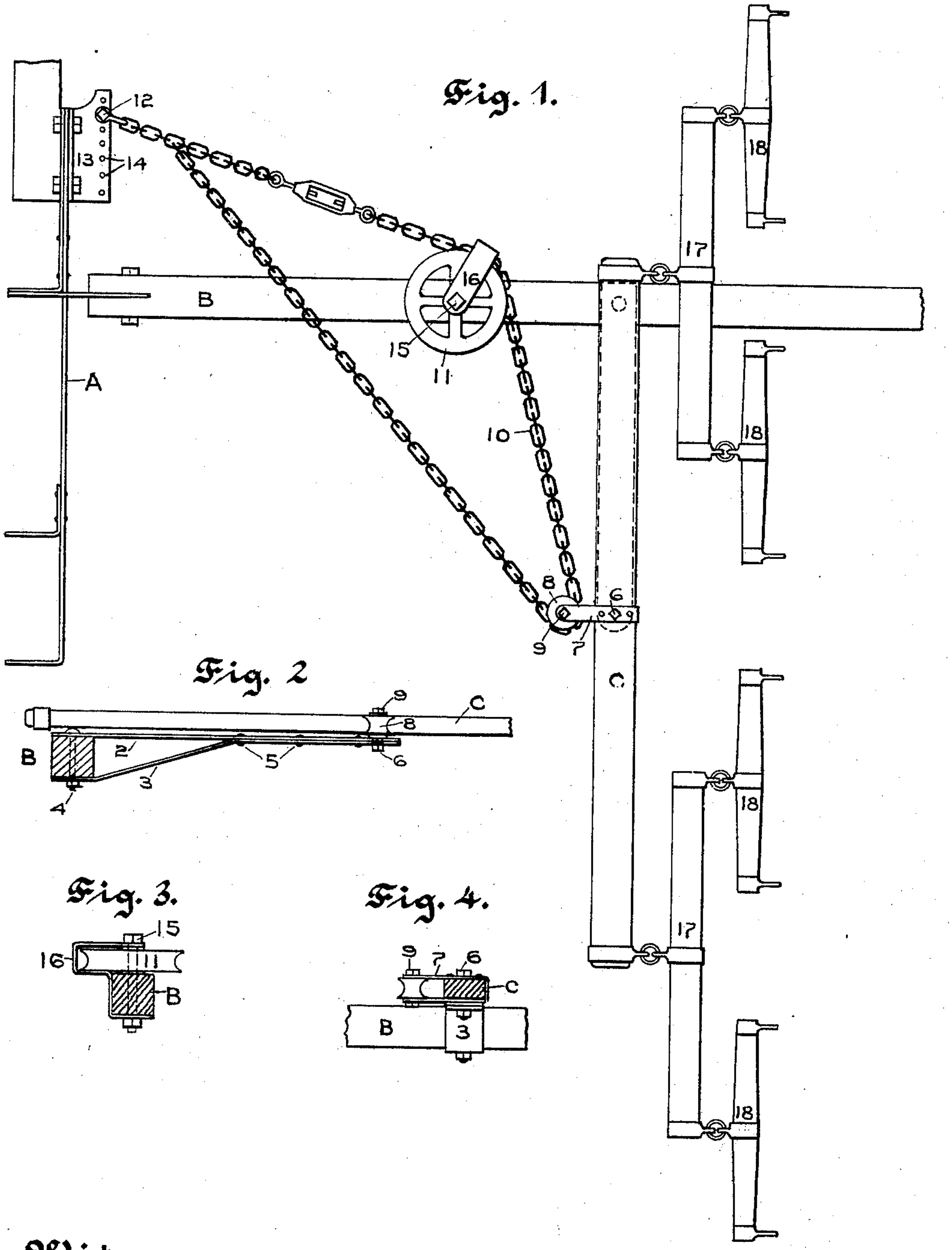
Witnesses,
W. H. Palmer.
Emily Eastman
Inventor,
Henry J. Zempel.
by Lothrop & Johnson
his Attorneys.

UNITED STATES PATENT OFFICE.

HENRY J. ZEMPEL, OF YELLOW BANK TOWNSHIP, MINNESOTA.

DRAFT-EQUALIZER.

SPECIFICATION forming part of Letters Patent No. 719,550, dated February 3, 1903.

Application filed March 11, 1902. Serial No. 97,711. (No model.)

*To all whom it may concern:*

Be it known that I, HENRY J. ZEMPEL, a citizen of the United States, residing in Yellow Bank township, in the county of Lac qui Parle and State of Minnesota, have invented certain new and useful Improvements in Draft-Equalizers, of which the following is a specification.

My invention relates to improvements in equalizers for eveners, its object being to provide an attachment for the eveners of harvesters and similar machines to equalize the draft.

In the accompanying drawings, forming part of this specification, Figure 1 is a plan view of my attachment applied to a four-horse evener. Fig. 2 is a rear view of the main evener-bar, partially broken away. Fig. 3 is a section through the pole, and Fig 4 is a section through the main evener-bar.

In the drawings, A represents the front portion of the framework of the harvester, to which is connected in the usual manner a pole B.

C represents a main evener-bar. The main evener-bar is supported from the pole by means of the straps 2 and 3. As shown in Fig. 2, the straps 2 and 3 at one end are secured upon opposite sides of the pole B by the bolt 4, passing through the pole. The opposite ends of the straps are connected by rivets 5 and connected with the evener by a bolt 6. Supported upon the evener-bar C by the bolt 6 is a rearwardly-extending bracket 7, in the end of which is pivotally supported the sheave 8 by means of the bolt 9. A chain 10 runs around the sheave 8 and around a larger sheave 11, mounted upon the pole, the opposite end of the chain being connected by a bolt 12 with the plate 13, carried by the machine. The plate 13 is provided with a series of openings 14 to permit the end of the chain being adjustably secured to the plate. The opposite end of the chain is connected with the body of the chain, as shown in Fig. 1. The sheave 11 is rotatably mounted upon the pole B by the bolt 15, passing through the pole. In order to hold the chain in the groove or sheave 11, I provide the hood 16, supported by the bolt 15. To the ends of the main evener-bar are connected the doubletrees 17, carrying singletrees 18.

With a mower or similar machine the work done by one side of the machine will bring the center of resistance to one side of the pole, which in the arrangement shown in the drawings would be the side of the pole upon which but one horse is positioned. By means of the adjustability of the equalizing-chain the draft can be equalized regardless of the number of horses used or the position of the center of resistance with relation to the center of the pole. In the ordinary constructions of draft-equalizers it is only possible to equalize the draft with reference to the center of the pole.

I claim—

1. In a draft-equalizer of the class described, the combination with a machine and connected pole, of a main evener-bar having its pivotal support offset to one side of the pole, a chain slidably connected with the evener-bar adjacent to its pivotal support, and adjustably connected with the framework upon the opposite side of the pole.

2. In a draft-equalizer of the class described, the combination with a machine and connected pole, of a main evener-bar having its pivotal support offset upon one side of the pole, an endless chain running over sheaves carried by the pole and evener-bar, and an adjustable connection between said chain and the framework upon the opposite side of the pole.

3. In a draft-equalizer of the class described, the combination with a machine and connected pole, of a main evener-bar having its pivotal support offset upon one side of the pole, sheaves carried by the pole and evener-bar, a chain passing around said sheaves and connected with the machine upon the opposite side of the pole, and means for adjusting the machine end of the chain with reference to the pole.

4. In a draft-equalizer of the class described, the combination with a machine and connected pole, of a bracket carried by the pole and projecting outwardly from one side thereof, a main evener-bar pivotally supported upon the opposite end of said bracket, a sheave supported upon the pole, a sheave carried by the main evener-bar adjacent to its pivotal support, and a chain passing around said sheaves and adjustably connected with the machine upon the opposite side of the pole.

In testimony whereof I affix my signature in presence of two witnesses.

HENRY J. ZEMPEL.

Witnesses:

H. S. JOHNSON,

EMILY EASTMAN.